(12) United States Patent
Raney

(10) Patent No.: US 9,838,277 B2
(45) Date of Patent: Dec. 5, 2017

(54) PACKET COPY MANAGEMENT FOR SERVICE CHAIN PROCESSING WITHIN VIRTUAL PROCESSING SYSTEMS

(71) Applicant: IXIA, Calabasas, CA (US)

(72) Inventor: Kristopher Raney, Austin, TX (US)

(73) Assignee: Keysight Technologies Singapore (Holdings) PTE LTD, Singapore (SG)

( * ) Notice: Subject to any disclaimer, the term of this patent is extended or adjusted under 35 U.S.C. 154(b) by 126 days.

(21) Appl. No.: 14/750,248

(22) Filed: Jun. 25, 2015

(65) Prior Publication Data

US 2016/0380848 A1    Dec. 29, 2016

(51) Int. Cl.
| | |
|---|---|
| G06F 15/167 | (2006.01) |
| H04L 12/26 | (2006.01) |
| H04L 29/08 | (2006.01) |
| H04L 29/06 | (2006.01) |

(52) U.S. Cl.
CPC ........ *H04L 43/028* (2013.01); *H04L 43/0876* (2013.01); *H04L 67/1097* (2013.01); *H04L 67/32* (2013.01); *H04L 67/38* (2013.01)

(58) Field of Classification Search
None
See application file for complete search history.

(56) References Cited

U.S. PATENT DOCUMENTS

| | | | |
|---|---|---|---|
| 8,196,138 B2 | 6/2012 | Allwell et al. | |
| 9,356,866 B1* | 5/2016 | Sivaramakrishnan | H04L 45/7453 |
| 2010/0017801 A1 | 1/2010 | Kundapur | |
| 2011/0314469 A1* | 12/2011 | Qian | H04L 49/9057 718/1 |
| 2012/0147890 A1* | 6/2012 | Kikuchi | H04L 12/4633 370/392 |
| 2013/0089106 A1* | 4/2013 | Tsirkin | H04L 49/9057 370/412 |
| 2013/0145073 A1 | 6/2013 | Tuch et al. | |

(Continued)

OTHER PUBLICATIONS

Open Networking Foundation, SDN Architecture, Technical Reference, Issue 1, 68 pgs. (Jun. 2014).

(Continued)

*Primary Examiner* — Mohamed Ibrahim
(74) *Attorney, Agent, or Firm* — Egan Peterman Enders Huston

(57) ABSTRACT

Systems and methods are disclosed to provide packet copy management for service chain processing within virtual processing systems. A packet manager virtual machine (VM) controls access to shared memory that stores packet data for packets being processed by service chain VMs operating within a virtual processing environment. For certain embodiments, the packet manager VM is configured to appear as a destination NIC (network interface controller), and virtual NICs (vNICs) within the service chain VMs are configured to process packet data using pointers to access the packet data within the shared memory. Once packet data is processed by one service chain VM, the next service chain VM within the service chain is able to access the processed packet data within the shared memory through the packet manager VM. Once all service chain processing has completed, the resulting packet data is available from the shared memory for further use or processing.

22 Claims, 8 Drawing Sheets

(56) References Cited

U.S. PATENT DOCUMENTS

2014/0143504 A1    5/2014  Beveridge
2014/0149981 A1*   5/2014  Luxenberg .......... G06F 9/45533
                                                           718/1

OTHER PUBLICATIONS

Ersue, "ETSI NFV Management and Orchestration—An Overview", IETF #88, 12 pgs. (2014).
Intel, "PCI-SIG-SR-IOV Primer", An Introduction to SR-IOV Technology, Revision 2.5, 28 pgs. (Jan. 2011).
Cisco, "Software Defined Networking: Why We Like It and How We Are Building on It", White Paper, 4 pgs. (2013).
Ixia, "Ixia xFilter", Data Sheet, 5 pgs. (May 2015).
Intel, "Intel Data Plane Development Kit (Intel DPDK) Overview Packet Processing on Intel Architecture", 35 pgs. (Dec. 2012).
IBM, "Virtio: An I/O Virtualization Framework for Linux ",9 pgs. (Jan. 2010).
Intel, "Intel Data Plane Development Kit (Intel DPDK With VMware VSphere", 16 pgs. (Aug. 2014).
Mohebbi, "ZIVM: A Zero-Copy Inter-VM Communication Mechanism for Cloud Computing", Computer and Information Science, vol. 4, No. 6, 10 pgs. (Nov. 2011).
Intel, "Network Function Virtualization", 49 pgs. (Oct. 2013).

* cited by examiner

PACKET COPY MANAGEMENT FOR SERVICE CHAIN PROCESSING WITHIN VIRTUAL PROCESSING SYSTEMS

TECHNICAL FIELD OF THE INVENTION

This invention relates to service chain processing of network packets within a network packet communication system.

BACKGROUND

Packet-based data networks continue to grow in importance, and it is often desirable to process network traffic associated with these packet-based networks through a series of packet processing devices. Each of these packet processing devices can be configured to provide similar or different packet processing, and the series of packet processing devices is often called a service chain. One environment that uses service chain packet processing is packet-based voice networks, such as cellular telephone networks that communicate voice and data information in part through network communication systems, such as the Internet.

FIG. 1 (Prior Art) is a block diagram of an example embodiment 100 for service chain processing of network packets as they travel to and from an end point device 104 with respect to a communication network 114, such as the Internet, through a number of service chain devices 106, 108, 110, and 112. The network packets can be communicated within one or more packet flows as indicated by packet flows 102. For the example embodiment 100, packets are processed by four different packet processing devices within a service chain including service chain devices 106, 108, 110, and 112. Each of the service chain devices 106, 108, 110, and 112 represent one or more devices that are configured to process the network packets. As one example, this service chain can represent packets being processed by a telephone communications network, as indicated above. Example service chain devices include, for example, network firewall devices, intrusion detection service (IDS) devices, load balancers, encryption offload processors, packet caches, and/or other packet processing devices.

Certain network communication systems include virtualized processing environments, such as virtual machines (VMs) operating within a virtualization layer hosted by one or more processing devices. For example, network cloud resources made available to network-connected systems are often virtualized such that processing devices associated with a server processing platform (e.g., server blade) and/or combinations of such server processing platforms are used to provide processing instances or virtual machines within cloud server processing systems. A virtual machine (VM) is an emulation of a processing system that is created within software being executed on a VM host hardware system. By creating and operating VMs within a VM host hardware system, the processing resources of that VM host hardware system can often be more efficiently utilized.

FIG. 2 (Prior Art) is a block diagram of an example embodiment 200 of service chain devices within a virtual processing environment. A virtual machine (VM) server 202 includes virtual machines (VMs) 104 and 106 that operate within a virtualization layer formed by hypervisor 204 operating on an operating system (OS) 206 which in turn is operating on computer hardware 208. The VM 104 is configured to operate as an end point device, and VM 106 is configured to operate as a first service chain device. Similarly, a virtual machine (VM) server 212 includes virtual machines (VMs) 110 and 112 that operate within a virtualization layer formed by hypervisor 214 operating on an operating system (OS) 216 which in turn is operating on computer hardware 218. The VM 110 is configured to operate as a third service chain device, and VM 112 is configured to operate as a fourth service chain device. A second service chain device 108 is configured as a stand-alone processing device separate from the VM servers 202 and 212. Further, the VM server 202, the VM server 212, and the second service chain device 108 are configured to communicate network packets through one or more network communication paths 220. The network communication paths 220 can be wired or wireless network communication paths or a combination of wired and wireless communication paths and can include one or more intervening network communication devices.

For the service chain path, packets sent or received by end point VM 104 with respect to a communication network 114, such as the Internet, are communicated through service chain VMs 106, 108, 110, and 112. For example, a transmit packet from end point VM 104 is first communicated to the first service chain VM 106 as represented by dashed arrow 222. To provide this communication, however, a copy of the packet is communicated from end point VM 104 to the hypervisor 204, and then a copy of the packet is communicated from the hypervisor 104 to the first service chain VM 106. The transmit packet is then communicated from the first service chain VM 106 to the second service chain device 108 as represented by dashed arrows 224 and 226. To provide this communication, however, a copy of the packet is communicated from the first service chain VM 106 through the hypervisor 204, operating system 206, and computer hardware 208 to the second service chain device 108 and back. The transmit packet is then communicated from the first service chain VM 106 to the third service chain VM 110 as represented by dashed arrow 228. To provide this communication, however, a copy of the packet is communicated from the first service chain VM 106 through the hypervisor 204, operating system 206, and computer hardware 208 to the third service chain device 110 through the computer hardware 218, operating system 216, and hypervisor 214 for the VM server 212. The transmit packet is then communicated from the third service chain VM 110 to the fourth service chain VM 112 as represented by dashed arrow 230. To provide this communication, however, a copy of the packet is communicated from the third service chain VM 110 to the hypervisor 212, and a copy of the packet is then communicated from the hypervisor 214 to the fourth service chain VM 112. A copy of the transmit packet is then communicated from the fourth service chain VM 112 to the communication network 114 through the hypervisor 214, the operating system 216, and the computer hardware 218. A receive packet from communication network 114 to the end point VM 104 will travel through the service chain in the opposite direction.

Thus, a large number of packet copies to and from the hypervisors 204/214 are required to be communicated to provide the service chain processing within the virtual environment shown with respect to embodiment 200. Further, this copying of packet data typically includes copying packet data into and out of hypervisor memory, into and out of memory for the VMs 104/106/110/112, and/or into and out of memory for physical NICs for the service chain devices. These copies and communications associated with the hypervisors 204/214 and the VMs 104/106/110/112 create significant problems in service chain processing as service chain components can apply packet modifications that cause the hypervisors 204/214 to become confused about which service chain components the packets have visited and which ones the packets have not visited. These packet modifications can include, for example, changing packet data for the network packet, adding network address translation (NAT) addresses to the packet data, applying modifications to the packet data based upon DPI (deep packet inspection) based QoS (quality of service) assessments, terminating packet flows, caching packet data, applying WAN (wide area network) acceleration to the packet flows, and/or modifying packets in other ways that potentially interfere with the tracking of packets for service chain processing within a virtual environment.

Because packets are not tagged in embodiment 200 of FIG. 2 (Prior Art) by the various virtual network functions (VNFs) provided by VMs 104, 106, 110, and 112 that process a packet as it traverses the service chain, the hypervisors 204/214 will have difficulties tracking or be unable to track the state of the packets. For example, if the same packet travels the same direction across a link between a service chain VM 104/106/110/112 and a hypervisor 204/214 two or more times and the VNFs are transparent, the hypervisor 204/214 will typically be unable to distinguish the position of the packet within the service chain. Further, if the VNFs implemented by the service chain VMs 104/106/110/112 alter the packets or terminate the packet flows, the hypervisors 204/214 will typically be unable to handle these modifications as they lack information as to how each component alters the packet. Further, the copying of packet data into and out of hypervisor memory, into and out of memory for the VMs 104/106/110/112, and/or into and out of memory for physical NICs for the service chain devices is time consuming and can add significant system latency. In short, service chain processing is problematic for service chain components that are incorporated as VNFs within a virtual processing environment.

SUMMARY OF THE INVENTION

Systems and methods are disclosed to provide packet copy management for service chain processing within virtual processing systems. The disclosed embodiments provide a packet manager virtual machine (VM) that controls access to shared memory that stores packet data for packets being processed within the service chain including service chain VMs operating within a virtual processing environment. For certain embodiments, the packet manager VM is configured to appear as a destination NIC (network interface controller) to service chain VMs within the virtual processing environment. Virtual NICs (vNICs) within the service chain VMs are configured to process packet data using pointers to access the packet data within the shared memory associated with the packet manager VM. Once packet data is processed by one service chain VM, the next service chain VM within the service chain is able to access the processed packet data within the shared memory through the packet manager VM. Once all service chain processing has completed in its predetermined sequence, a final destination device is able to access the shared memory associated with the packet manager VM to obtain the resulting packet data for further use or processing. Other features and variations can be implemented, if desired, and related systems and methods can be utilized, as well.

For one embodiment, a method to manage packets for service chain processing is disclosed including operating a plurality of virtual machines (VMs) within a virtualization layer running on at least one processing device where the plurality of VMs include a packet manager VM and at least two service chain VMs with the service chain VMs being configured to process received packets in a predetermined order, receiving a network packet at the packet manager VM, storing packet data for the network packet within a shared memory for the packet manager VM, processing the packet data with the service chain VMs in the predetermined order using address pointers to access the packet data within the shared memory and without copying the packet data to memory associated with the service chain VMs, and transmitting the processed packet data from the packet manager VM to another destination.

In additional embodiments, the method includes providing a virtual network interface controller (vNIC) for each of the plurality of VMs and using the vNICs to communicate the pointers. In further embodiments, the method includes using receive queues within the vNICs for the service chain VMs to store receive address pointers for packet data within the shared memory to be processed by the service chain VMs, and using transmit queues within the vNICs for the service chain VMs to store transmit address pointers for packet data within the shared memory that has been processed by the service chain VMs. In still further embodiments, the method includes controlling the predetermined order with the packet manager VM by controlling storage of the receive address pointers using the packet manager VM.

In other embodiments, the transmitting includes transmitting the processed packet data to a packet analysis tool. Still further, the packet analysis tool can include an additional virtual machine (VM) operating within the virtualization layer and configured to analyze the processed packet data.

In further embodiments, the at least one processing device is located within a first server system, and the destination is a virtual machine (VM) operating within a second virtualization layer running on at least one processing device located in a second server system. Still further, the method can include operating a plurality of second VMs within the second virtualization layer, and the plurality of second VMs can include a second packet manager VM and a at least two additional service chain VMs.

In still further embodiments, the method includes tracking a state of the packet data with respect to processing by the service chain VMs using the packet manager VM. Still further, the method can include adding a tag to the packet data within the packet manager VM to track the state of the packet data.

In additional embodiments, the method includes applying one or more packet filters to the packets received by the packet manager VM. Still further, the method can include using the one or more packet filters within the packet manager VM to determine in part whether packet data is processed by one or more of the service chain VMs.

For another embodiment, a system to manage packets for service chain processing is disclosed including at least one processing device configured to provide a virtualization layer for a plurality of virtual machines (VMs), at least two service chain VMs configured to operate within the virtualization layer where the service chain VMs are configured to process received packets in a predetermined order, a packet manager VM configured to operate within the virtualization layer, the packet manager VM being configured to receive packets being processed by the service chain VMs, and a shared memory included within the packet manager VM configured to store packet data for packets being processed by the service chain VMs where the service chain VMs are configured to use address pointers to access the packet data within the shared memory without copying the packet data to memory associated with the service chain VMs, and where the packet manager VM is further configured to provide processed packet data to another destination.

In additional embodiments, each of the service chain VMs and the packet manager VM include a virtual network interface controller (vNIC) configured to communicate the pointers. In further embodiments, the system includes receive queues within the vNICs for the service chain VMs configured to store receive address pointers for packet data within the shared memory to be processed by the service chain VMs, and transmit queues within the vNICs for the service chain VMs configured to store transmit address pointers for packet data within the shared memory that has been processed by the service chain VMs. In still further embodiments, the packet manager VM is further configured to control the predetermined order by controlling storage of the receive address pointers.

In other embodiments, the destination includes a packet analysis tool. Still further, the packet analysis tool can be an additional virtual machine (VM) configured to operate within the virtualization layer and to analyze the processed packet data.

In further embodiments, the at least one processing device is located within a first server system, and the destination includes a virtual machine (VM) configured to operate within a second virtualization layer running on at least one processing device located in a second server system. Still further, a plurality of second VMs can be configured to operate within the second virtualization layer, and the plurality of second VMs can include a second packet manager VM and a at least two additional service chain VMs.

In still further embodiments, the packet manager VM is further configured to track a state of the packet data with respect to processing by the service chain VMs. Still further, the packet manager VM can be further configured to add a tag to the packet data to track the state of the packet data.

In additional embodiments, the packet manager VM is further configured to apply one or more packet filters to the packets received by the packet manager VM. Still further, the one or more packet filters can be configured to determine in part whether packet data is processed by one or more of the service chain VMs.

Different or additional features, variations, and embodiments can be implemented, if desired, and related systems and methods can be utilized, as well.

DESCRIPTION OF THE DRAWINGS

It is noted that the appended drawings illustrate only example embodiments of the invention and are, therefore, not to be considered limiting of its scope, for the invention may admit to other equally effective embodiments.

DETAILED DESCRIPTION OF THE INVENTION

Systems and methods are disclosed to provide packet copy management for service chain processing within virtual processing systems. The disclosed embodiments provide a packet manager virtual machine (VM) that controls access to shared memory that stores packet data for packets being processed within the service chain including service chain VMs operating within a virtual processing environment. For certain embodiments, the packet manager VM is configured to appear as a destination NIC (network interface controller) to service chain VMs within the virtual processing environment. Virtual NICs (vNICs) within the service chain VMs are configured to process packet data using pointers to access the packet data within the shared memory associated with the packet manager VM. Once the packet data is processed by one service chain VM, the next service chain VM within the service chain is able to access the processed packet data within the shared memory through the packet manager VM. Once all service chain processing has completed in its predetermined sequence, a final destination device is able to access the shared memory associated with the packet manager VM to obtain the resulting packet data for further use or processing. Different features and variations can be implemented, as desired, and related systems and methods can be utilized, as well.

Figure 3A:
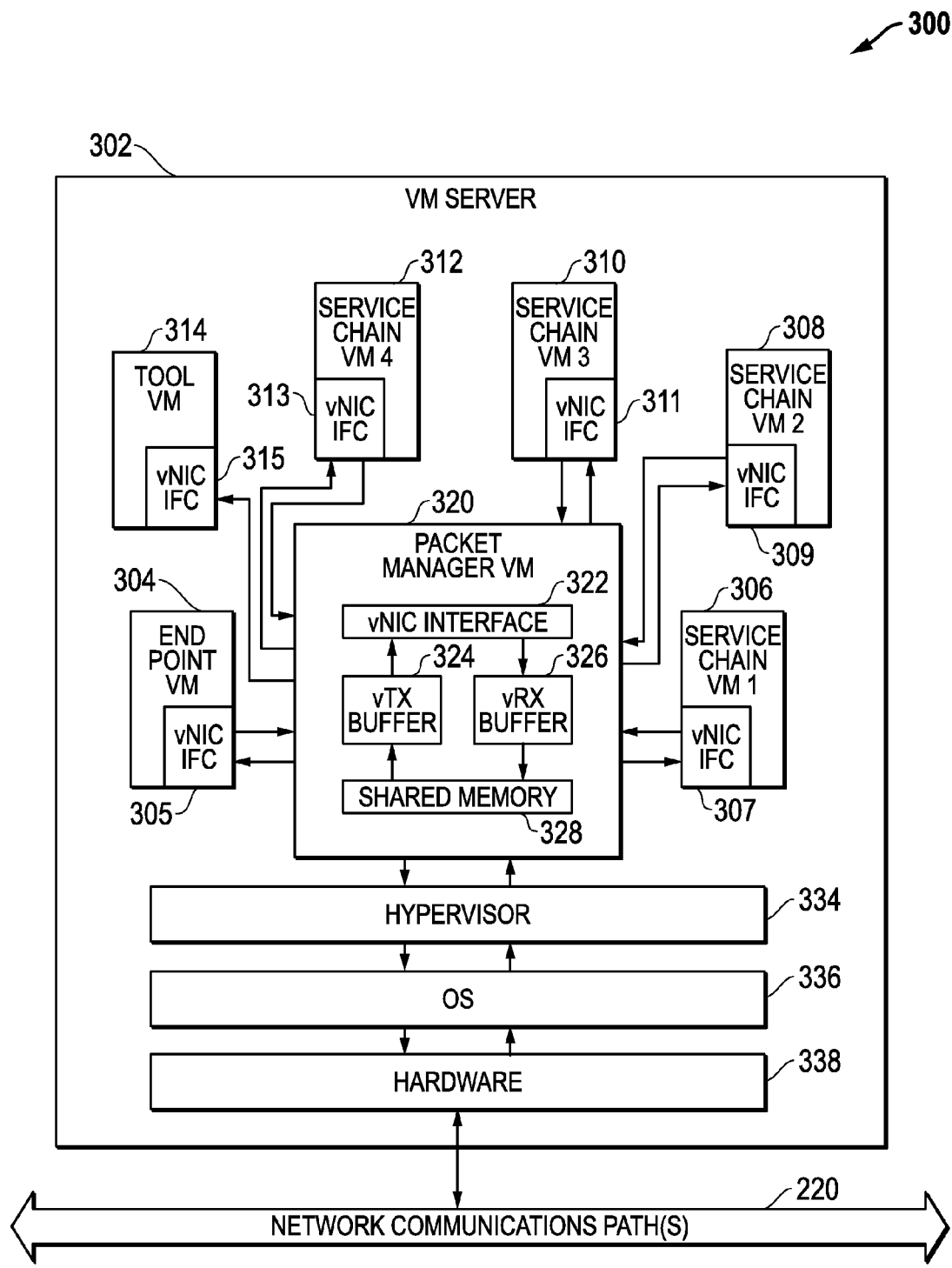
FIG. 3A is a block diagram of an example embodiment where a virtual machine (VM) server includes a virtual machine (VM) configured to operate as a packet manager with shared memory that facilitates the reduction or elimination of packets copies required for service chain processing within a virtual processing environment.

FIG. 3A is a block diagram of an example embodiment 300 where a virtual machine (VM) server 302 includes a virtual machine (VM) 320 configured to operate as a packet manager with shared memory 328 that facilitates the reduction or elimination of packets copies required for service chain processing within a virtual processing environment. For the embodiment depicted, a number of VMs 304, 306, 308, 310, 312, and 314 as well as the packet manager VM 320 operate within a virtualization layer formed by hypervisor 334 operating on an operating system (OS) 336 which in turn is operating on computer hardware 338. The VM 304 is configured to operate as an end point device. The VM 306 is configured to operate as a first service chain device. The VM 308 is configured to operate as a second service chain device. The VM 310 is configured to operate as a third service chain device. The VM 312 is configured to operate as a fourth service chain device. Further, other VMs can also operate within the virtual environment such as VM 314 that is configured to operate as a packet analysis tool. The service chain VMs 306, 308, 310, and 312 are configured to process packets within a predetermined order within the service chain processing path as packet data is communicated to and from the end point VM 304 with respect to a network coupled to the network communication paths 220. It is also noted that the end point VM 304 can be considered a zero level service chain VM, as it represents the initial origination point or the final destination point for packets being communicated.

The packet manager VM 320 includes a shared memory 328 that is made visible to the other VMs through a virtual network interface controller (vNIC) interface 322 which allows access to a virtual transmit (vTX) buffer 324 and to a virtual receive (vRX) buffer 326 that are coupled to the shared memory 328. For example, the VM 304 includes a vNIC interface (IFC) 305 that is configured to communicate with the vNIC interface 322 for the packet manager VM 320 to access the shared memory 328. Similarly, the VM 306 includes a vNIC interface 307 that is configured to communicate with the vNIC interface 322 for the packet manager VM 320 to access the shared memory 328. The VM 308 includes a vNIC interface 309 that is configured to communicate with the vNIC interface 322 for the packet manager VM 320 to access the shared memory 328. The VM 310 includes vNIC interface 311 that is configured to communicate with the vNIC interface 322 for the packet manager VM 320 to access the shared memory 328. The VM 312 includes a vNIC interface 313 that is configured to communicate with the vNIC interface 322 for the packet manager VM 320 to access the shared memory 328. And the VM 314 includes a vNIC interface 315 that is configured to communicate with the vNIC interface 322 for the packet manager VM 320 to access the shared memory 328. As described further below, each of the vNIC interfaces 305/307/309/311/313/315 are configured to use address pointers to access the shared memory 328 through the vNIC interface 322 when processing packet data within the shared memory 328. As such, although the packet manager VM 320 is providing access to shared memory 328 for the service chain operations and/or additional VM functionality within the VM server 302, the different service chain VMs 304, 306, 308, 310, and 312, as well as the additional tool VM 314, see the packet manager VM 320 as a destination NIC and communicate with packet manager VM 320 as through the vNIC interface 322.

In operation, the shared memory 328 stores packet data for the packets being processed by the service chain including VMs 304, 306, 308, 310, and 312. Once one service chain VM within the service chain processes the packet data within the shared memory 328 associated with packet manager VM 320, the packet manager VM 320 makes the packet data available to the next service chain VM within the service chain. Further, once the service chain processing has completed, the shared memory 328 can also make the resulting processed packet data available to other destination VMs within the virtual processing environment, such as the tool VM 314, or can provide the resulting processed packet data to one or more destination devices coupled to the network communication paths 220. As such, copies of packets being processed are not required to be created, forwarded to, and stored within memories for each of the VMs 304, 306, 308, 310, 312, and/or 314 as the shared memory 328 stores the packet data as it is being processed. Further, as described in more detail below, the packets can be tagged or modified, such as through the use of GRE (Generic Routing Encapsulation), to identify the current state of the packet data within the service chain processing. The shared memory 328 and the packet manager VM 320 thereby provide for a reduction in the number of packet copies required to be created, transferred, and stored with respect to the hypervisor 334 and the service chain VMs 304/306/308/310/312, preferably reaching zero copies in some implementations. As such, the efficiency of the service chain processing is increased, and overall system latency is reduced.

Figure 3B:
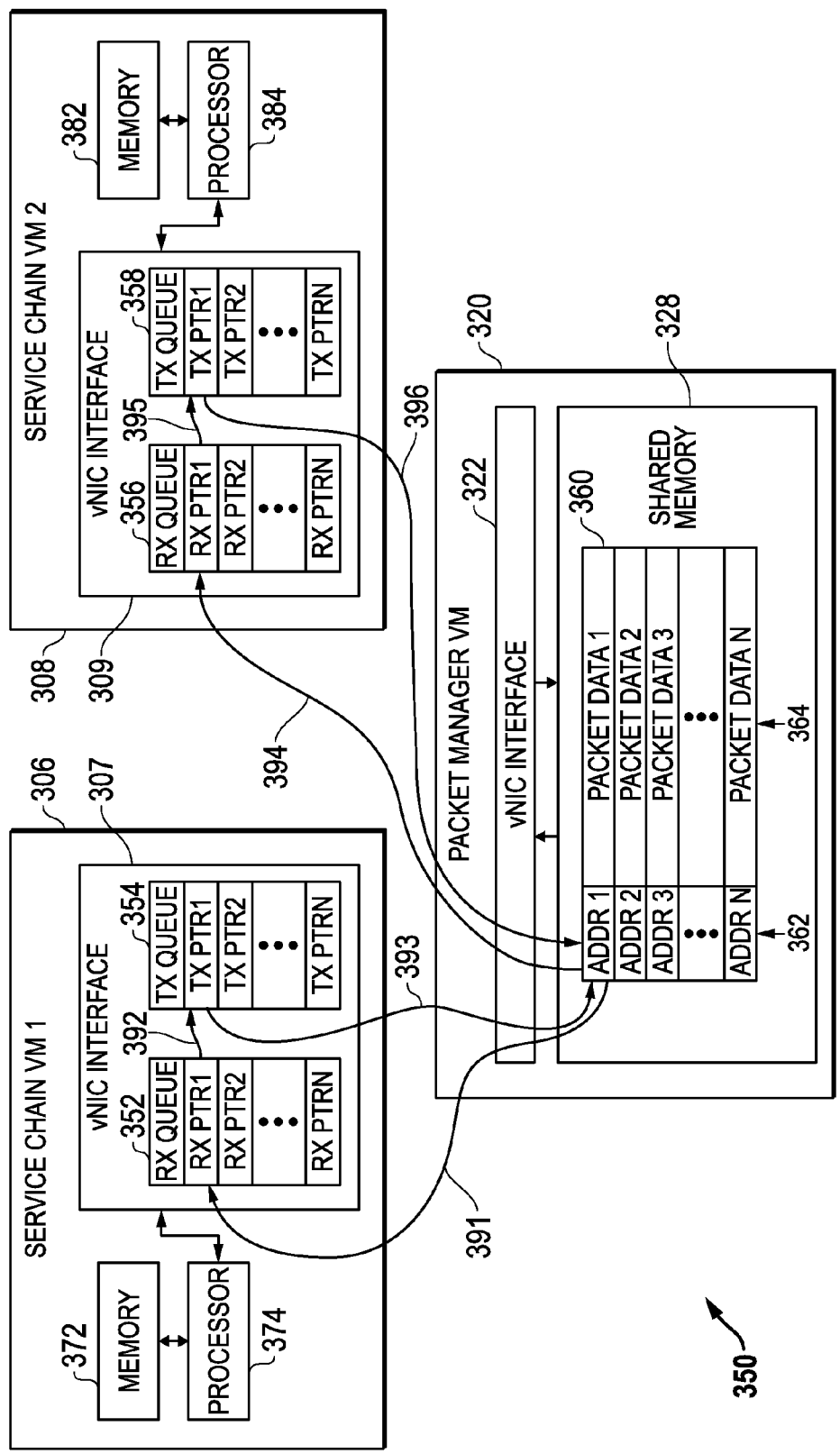
FIG. 3B is a block diagram of an example embodiment where packet data is stored in shared memory within the packet manager VM and pointers are stored in transmit and receive queues within virtual network interface controllers (vNICs) for the server chain VMs.

FIG. 3B is a block diagram of an example embodiment 350 where packet data is stored in shared memory 328 within the packet manager VM 320 and address pointers are stored in transmit and receive queues 352/354/356/358 within virtual network interface controllers (vNICs) 307/309 for server chain VMs 306/308. The shared memory 328 within the packet manager VM 320 includes data records 360 that store addresses 362 and packet data 364 for a plurality of packets being processed within the virtual service chain, which includes the first and second service chain VMs 306/308 for embodiment 350. The first service chain VM 306 includes virtual resources such as memory 372 and processor 374, as well as vNIC 307. The vNIC 307 communicates with the vNIC interface 322 and includes a receive (RX) queue 352 that holds receive address pointers (RX PTR1, RX PTR2, RX PTR3 . . . RX PTRN) that point to packet data within shared memory 328 that is to be processed by the first service chain VM 306. The vNIC 307 also includes a transmit (TX) queue 354 that holds transmit address pointers (TX PTR1, TX PTR2, TX PTR3 . . . TX PTRN) that point to packet data within shared memory 328 that has been processed by the first service chain VM 306. Similarly, the second service chain VM 308 includes virtual resources such as memory 382 and processor 384, as well as vNIC 309. The vNIC 309 communicates with the vNIC interface 322 and includes a receive (RX) queue 356 that holds receive address pointers (RX PTR1, RX PTR2, RX PTR3 . . . RX PTRN) that point to packet data within shared memory 328 that is to be processed by the second service chain VM 308. The vNIC 309 also includes a transmit (TX) queue 358 that holds transmit address pointers (TX PTR1, TX PTR2, TX PTR3 . . . TX PTRN) that point to packet data within shared memory 328 that has been processed by the second service chain VM 308.

In operation, packet data is stored within the shared memory 328 and processed by the processors 374/384 for the service chain VMs 306/308 without being copied into memory 372/382 for the service chain VMs 306/308. Instead of copying the packet data into the memories 372/374, receive and transmit queues 352/354/356/358 are used to store address pointers that point to the packet data within the shared memory 328 that is being processed. When a receive address pointer is stored in one of the receive queues 352/362, the respective service chain VM 306/308 knows that there is packet data available within the shared memory 328 for it to process. When a transmit address pointer is stored in one of the transmit queues 354/364, the packet manager VM 320 knows that there is processed packet data within the shared memory 328 that is available to be processed by the next step in the service chain. As such, the large number of packet copies to hypervisor memory, VM memories, and/or NIC memories required by prior solutions is avoided by the shared memory 328 and the packet manager 320.

As one further example, arrows 391/392/393/394/395/396 have been provided to represent example flow of address pointers with respect to the vNIC interfaces 307/309 for the service chain VMs 306/308 and the vNIC interface 322 for the packet manager VM 320. It is assumed for this example that a packet has been received by VM server 302 from the network communication paths 220 and that first packet data (PACKET DATA 1) for this packet has been stored at a first address (ADDR1) within the plurality of data records 360. It is also assumed that the first service chain VM 306 is to process this packet data followed by the second service chain VM 308.

With respect to the first service chain VM 306, the packet manager VM 320 first stores a receive address pointer (RX PTR1) within the receive queue 352 for the first service chain VM 306 as represented by arrow 391. This receive address pointer (RX PTR1) points to the address (ADDR1) for the packet data (PACKET DATA 1) within the shared memory 328. The first service chain VM 306 then processes the packet data (PACKET DATA 1). Once the processing is completed by the first service chain VM 306, the processed packet data is again stored as the packet data (PACKET DATA 1) at the same address (ADDR1) within the shared memory 328. A transmit address pointer (TX PTR1) for this address (ADDR1) is then stored within the transmit queue 354 as represented by arrow 392. As represented by arrow 393, the packet manager VM 320 then recognizes that processed packet data from the first service chain VM 306 is ready for further processing and is located at the address (ADDR1) pointed to by the transmit address pointer (TX PTR1).

With respect to the second service chain VM 308, the packet manager VM 320 then stores a receive address pointer (RX PTR1) within the receive queue 356 for the second service chain VM 308 as represented by arrow 394. This address pointer (RX PTR1) corresponds to the address (ADDR1) for the packet data (PACKET DATA 1) within the shared memory 328 that has already been processed by the first service chain VM 306. The second service chain VM 308 then further processes the packet data (PACKET DATA 1). Once the processing is completed by the second service chain VM 308, the processed packet data is again stored as the packet data (PACKET DATA 1) at the same address (ADDR1) within the shared memory 328. A transmit address pointer (TX PTR1) for this address (ADDR1) is then written to the transmit queue 364 as represented by arrow 395. As represented by arrow 396, the packet manager VM 320 then recognizes that processed packet data from the second service chain VM 308 is ready for further processing and is located at the address (ADDR1) pointed to by the transmit address pointer (TX PTR1).

At this point, additional service chain processing can be provided or the resulting processed packet data can be provided to one or more destinations.

Figure 4:
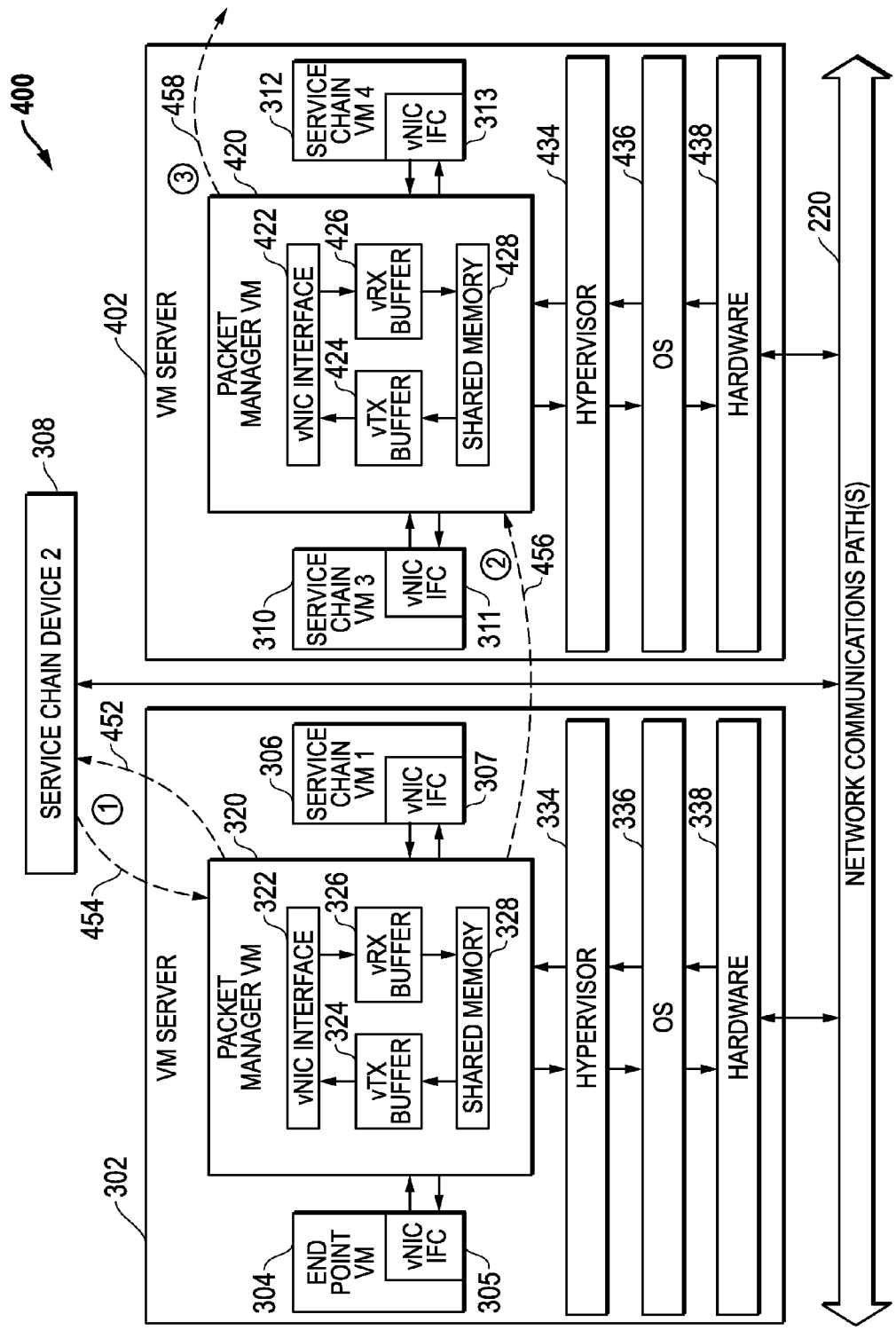
FIG. 4 is a block diagram of an example embodiment where service chain processing is separated among a first VM server and a second VM server.

FIG. 4 is a block diagram of an example embodiment 400 where service chain processing is separated among a first VM server 302 and a second VM server 402. For embodiment 400, each VM server 302/402 includes a virtual machine (VM) 320/420 configured to operate as a packet manager with shared memory 328/428 that facilitates the reduction or elimination of packets copies required for service chain processing within a virtual processing environment. The VM server 302 for embodiment 400 is similar to the VM server 302 for embodiment 300; however, only end point VM 304 and the first service chain VM 306 are operating within the VM server 302 for embodiment 400. The second service chain device 308 is a stand-alone device, and the third service chain VM 310 and the fourth service chain VM 312 are operating within the VM server 402. It is further noted that the VM server 402 can be implemented similarly to the VM server 302.

Looking to VM server 402, a number of VMs 310 and 312 as well as the packet manager VM 420 operate within a virtualization layer formed by hypervisor 434 operating on an operating system (OS) 436 which in turn is operating on computer hardware 438. The VM 310 is configured to operate as a third service chain device, and the VM 312 is configured to operate as a fourth service chain device. The packet manager VM 420 includes a shared memory 428 that is made visible to the other VMs through a virtual network interface controller (vNIC) interface 422 that allows access to a virtual transmit (vTX) buffer 424 and to a virtual receive (vRX) buffer 426 that are coupled to the shared memory 328. For example, the VM 310 includes vNIC interface 311 that is configured to communicate with the vNIC interface 422 for the packet manager VM 420 to access the shared memory 428, and the VM 312 includes a vNIC interface 313 that is configured to communicate with the vNIC interface 422 for the packet manager VM 420 to access the shared memory 428. Each of the vNIC interfaces 311/313 are configured to use address pointers to access the shared memory 428 through the vNIC interface 422 when processing packet data within the shared memory 428. As such, although the packet manager VM 420 is providing shared memory 428 for the service chain operations and/or additional VM functionality within the VM server 402, the different service chain VMs 310 and 312 see the packet manager 420 as a destination NIC and communicate with the packet manager 320 through the vNIC interface 422.

Figure 1:
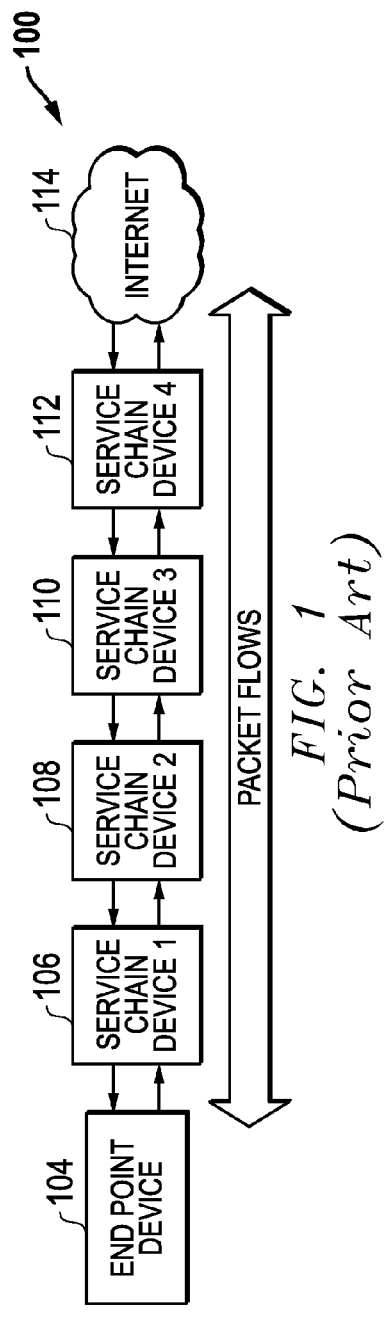
FIG. 1 (Prior Art) is a block diagram of an example embodiment for service chain processing of network packets as they travel to and from an end point device with respect to a communication network such as the Internet.
Figure 2:
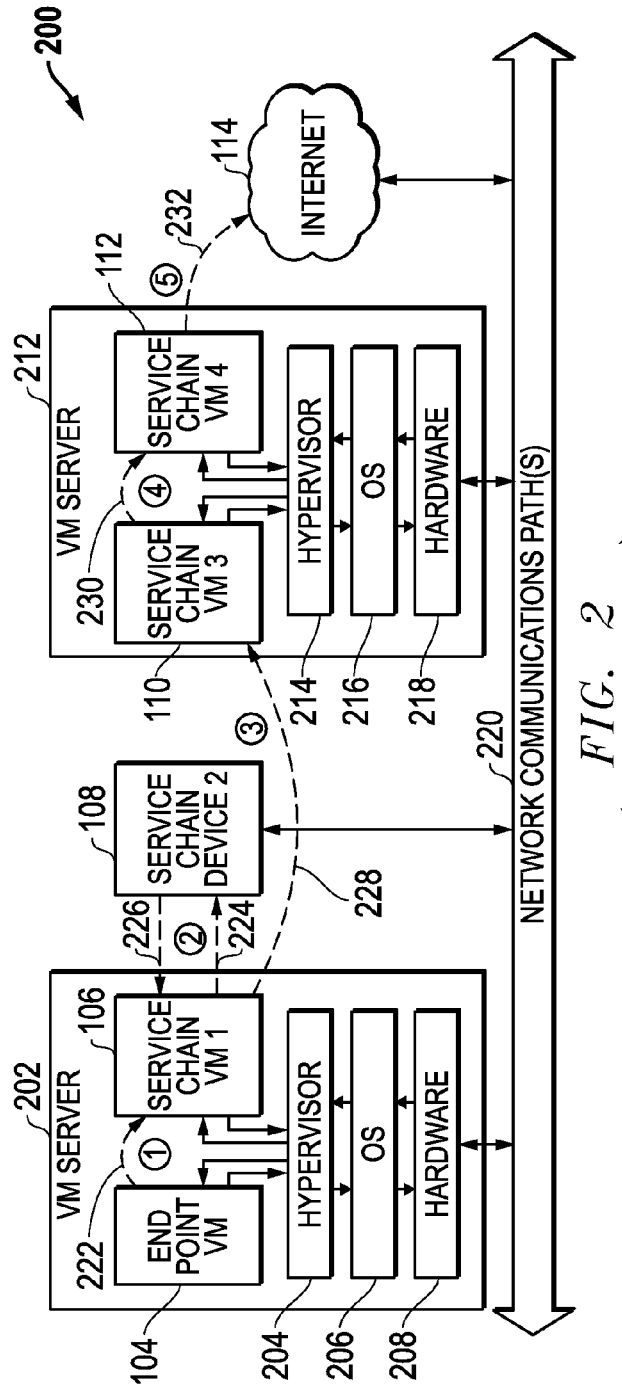
FIG. 2 (Prior Art) is a block diagram of an example embodiment of service chain devices within a virtual processing environment.

In operation, the shared memory 328 stores the packet data for the packets being processed by the service chain VMs 304 and 306 within the VM server 302. Similarly, the shared memory 428 stores the packet data for the packets being processed by the service chain VMs 310 and 312 within the VM server 402. As the second chain device 308 sits outside the VM servers 302 and 402 for embodiment 400, copies of packets are forwarded to and from this second chain device 308 as represented by dashed arrows 452 and 454. Further, as represented by dashed arrows 456 and 458, a copy of a packet is forwarded from the VM server 302 to the VM server 402 and from VM server 402 to a network, such as the Internet. As such, copies of packets being processed are reduced with respect to embodiment 200 of FIG. 2 (Prior Art) as the shared memory 328 and the shared memory 428 store packet data for packets being processed by the service chain VMs 304/306/310/312 within the VM server 302 and 402, respectively. Further, as described herein, the packets can be tagged or modified, such as through the use of GRE (Generic Routing Encapsulation), to identify the current state of the packet data as it is being processed within the service chain.

It is noted that the VM servers 302/402 can be implemented using one or more processing devices. For example, the VM servers 302/402 can be implemented using one or more processors, microcontrollers, configurable logic devices (e.g., CPLD (complex programmable logic device), FPGAs (field programmable gate array)), and/or other processing devices that are programmed with software and/or other programming instructions to implement the described functionality. It is further noted that software and/or other programming instructions used for the VM servers 302/402 and/or their components can be implemented as software and/or programming instructions embodied in a non-transitory computer-readable medium (e.g., memory storage devices, FLASH memory, DRAM memory, reprogrammable storage devices, hard drives, floppy disks, DVDs, CD-ROMs, etc.) and that are executed by processing devices used by the VM servers 302/402 to cause the processing devices to perform the processes, functions, and/or capabilities described herein.

Figure 5A:
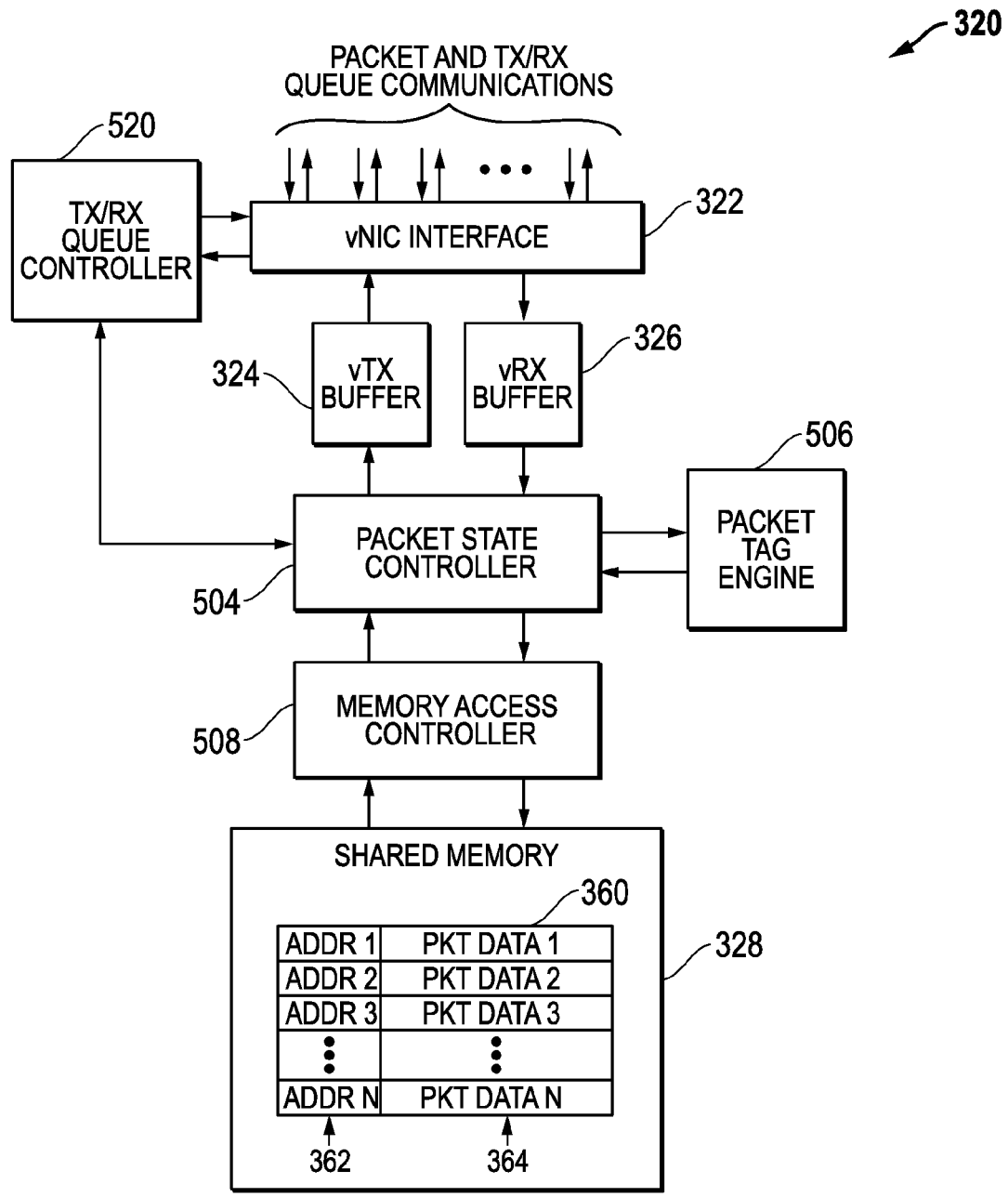
FIG. 5A is a block diagram of an example embodiment for a packet manager VM including a packet state controller and a memory access controller.

FIG. 5A is a block diagram of an example embodiment for the packet manager VM 320 that includes a packet state controller 504 and a memory access controller 508. It is also noted that the packet manager 420 within VM server 402 for FIG. 4 can be configured similarly to the example embodiments for packet manager 320 in FIGS. 5A-5B. As described above, the different VMs within the VM server 302 communicate with the packet manager VM 320 through a vNIC interface 322 to access the shared memory 328. In part, a virtual transmit (vTX) buffer 324 and a virtual receive buffer (vRX) 326 are used to facilitate these communications and storage of packet data within the shared memory 328. These buffers 324/326 can be implemented, for example, as ring buffers that store packet data for a particular number of packets. Storage of packet data begins at the first address within the receive ring buffer or the transmit ring buffer, and the next available address is used for data associated with subsequently received packets. Once the last address within the receive buffer or the transmit buffer is reached, the data for the next packet replaces the data at the first address within the ring buffer. This process continues as the packet manager 320 operates to process packet communications within the VM server 302 through the vNIC interface 322.

The VM server 302 uses the transmit/receive (TX/RX) queue controller 520 to control the address pointers stored within the receive/transmit queues for the service chain VMs, such as the queues 352/354/356/358 shown in FIG. 3B. For example, the queue controller 520 writes receive address pointers to the receive queues 352/356 when packet data is ready to be processed by a service chain VM, and the queue controller 520 reads transmit address pointers from the transmit queues 354/358 when packet data has been processed by a service chain VM. By controlling the address pointers within the receive and transmit queues, therefore, the VM server 302 is able to control the processing of the packet data through the service chain such that the service chain processing is performed in a predetermined order. It is further noted that the transmit and receive queues 352/354/356/358 can also be implemented, for example, as ring buffers.

As indicated above, the VM server 302 can also manage the state of the packet data as it is processed through the service chain. For example, a packet state controller 504 can receive incoming packet data from the virtual receive buffer 326 and can use a packet tag engine 506 to modify the packet data to identify the current state of the packet data. Similarly, the packet state controller 504 can receive outgoing packet data that is being sent to the virtual transmit buffer 324 and can use the packet tag engine 506 to modify the outgoing packet data to identify the current state of the packet. For example, as indicated above, the packet tag engine 506 can be used to apply GRE tags to the packet data in order to identify the current state of the packet. It is noted that this state information tracked by the packet state controller 504 can identify, for example, the current position for the packet within the service chain processing. Other state information can also be tracked, as desired, using the packet state controller 504 and the packet tag engine 506.

Packet data for packets received through the virtual receive buffer 326 is provided to memory access controller 508. The memory access controller 508 receives the packet data and stores the packet data within the shared memory 328. The memory access controller 508 also provides the packet data back to the virtual transmit buffer 324 so that it can be accessed by the next VM within the service chain. The packet data stored in the shared memory 328 can be stored with state information if a packet state controller 504 is used to modify the packet data and/or can be stored without state information if a packet state controller 504 is not used to modify the packet data. It is noted that the shared memory 328 can be configured to include a plurality of data records 360 that store packet data 364 for packets received by the packet manager 320 at memory addresses 362 for the shared memory 328.

Figure 5B:
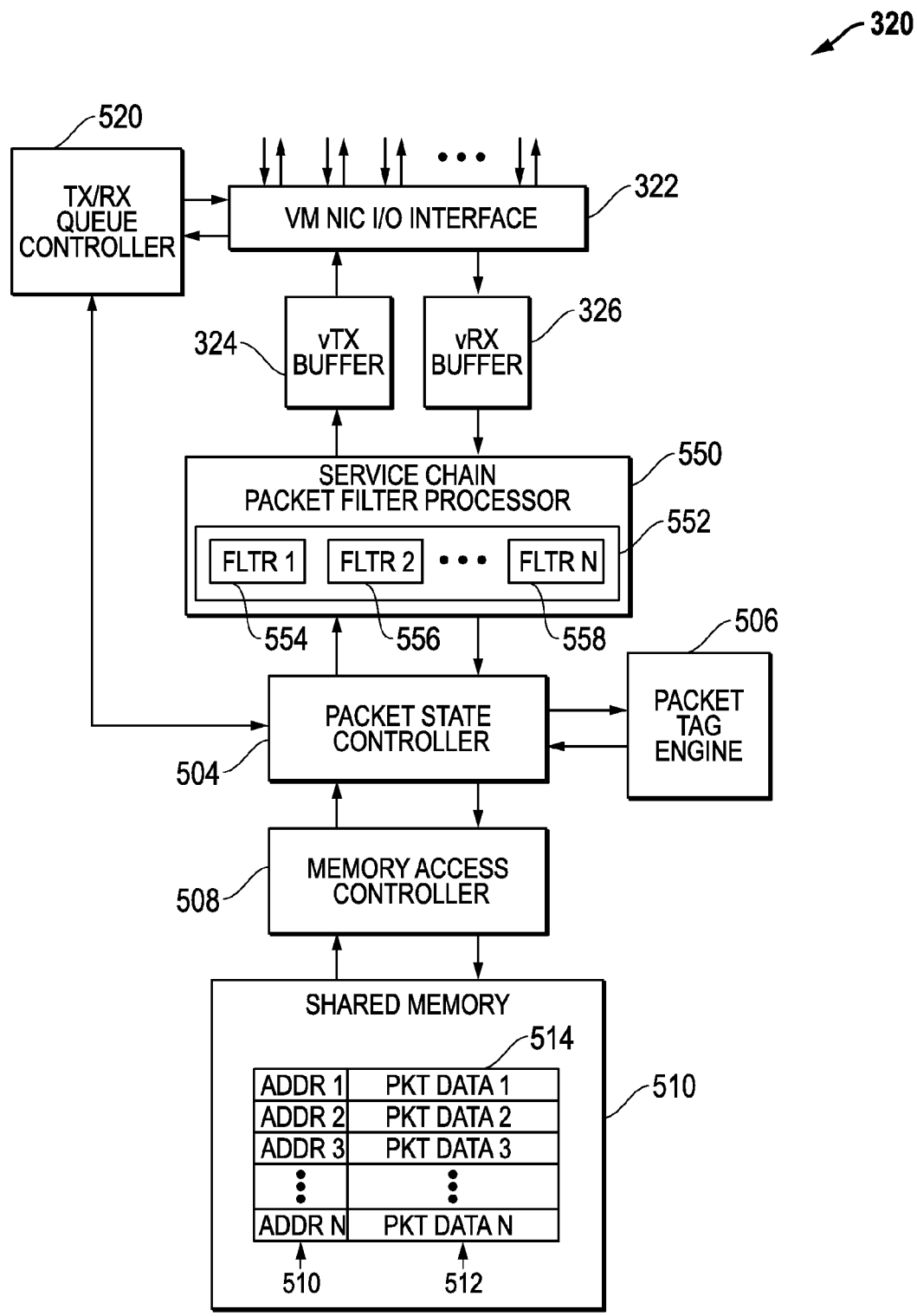
FIG. 5B is a block diagram of an example embodiment for a packet manager VM including a service chain packet filter processor.

FIG. 5B is a block diagram of an example embodiment for the packet manager VM 320 including a service chain packet filter processor 550. The packet filter processor 550 includes one or more packet filters 552 that are configured to control how packets are processed within the service chain provided by the different service chain VMs. For example, the first packet filter (FLTR1) 554 can be configured to pass only packets meeting a first set of parameters to a particular service chain VM, such as the third service chain VM 310 in FIG. 3A. The second packet filter (FLTR2) 546 can be configured to pass only packets meeting a second set of parameters to a particular service chain VM, such as the fourth service chain VM 312. Other packet filters through an Nth packet filter (FLTRN) 558 can be used to provide additional filtering to select which packets are processed by which service chain VMs within the VM server 302. As such, packets being received and managed by the packet manager VM 320 can be selectively processed by the various components within the service chain processing based upon the packet filters 552 implemented by the packet filter processor 550.

It is noted that that the packet filters 550 can rely upon various portions of the content of network packets for filter parameters. For example, network packets typically include a link layer header (L2), a network layer header (L3), a transport layer header (L4), and a payload, as well as other network layers (e.g., layers within the Open Systems Interconnect (OSI) model for network communications). The parameters used by the packet filters 550, therefore, can be configured to include values in any ISO (International Standards Organization) OSI network layer 2 (L2) through layer 7 (L7) header value or packet content. Information pertinent to forwarding the packet, such as source ID and destination ID and protocol type, is usually found in the packet headers. Packets may also have various other fields and information within them, such as fields including error check information, virtual local area network (VLAN) identifiers, and/or other information that may be matched and used for filtering. Further, information representing the source device may include items such as the IP address of the source device or the MAC (Media Access Control) address of the source device. Similarly, information representing the destination device may be included within the packet such as the IP address of the destination device. As such, a wide variety of source and destination identifying information may be included within the packets as well as other packet related information along with the data included within the payload of the packet. These packet contents and/or combinations of packet contents can be used to define parameters for the packet filters 552 and thereby determine how packets are processed within the service chain.

Figure 6A:
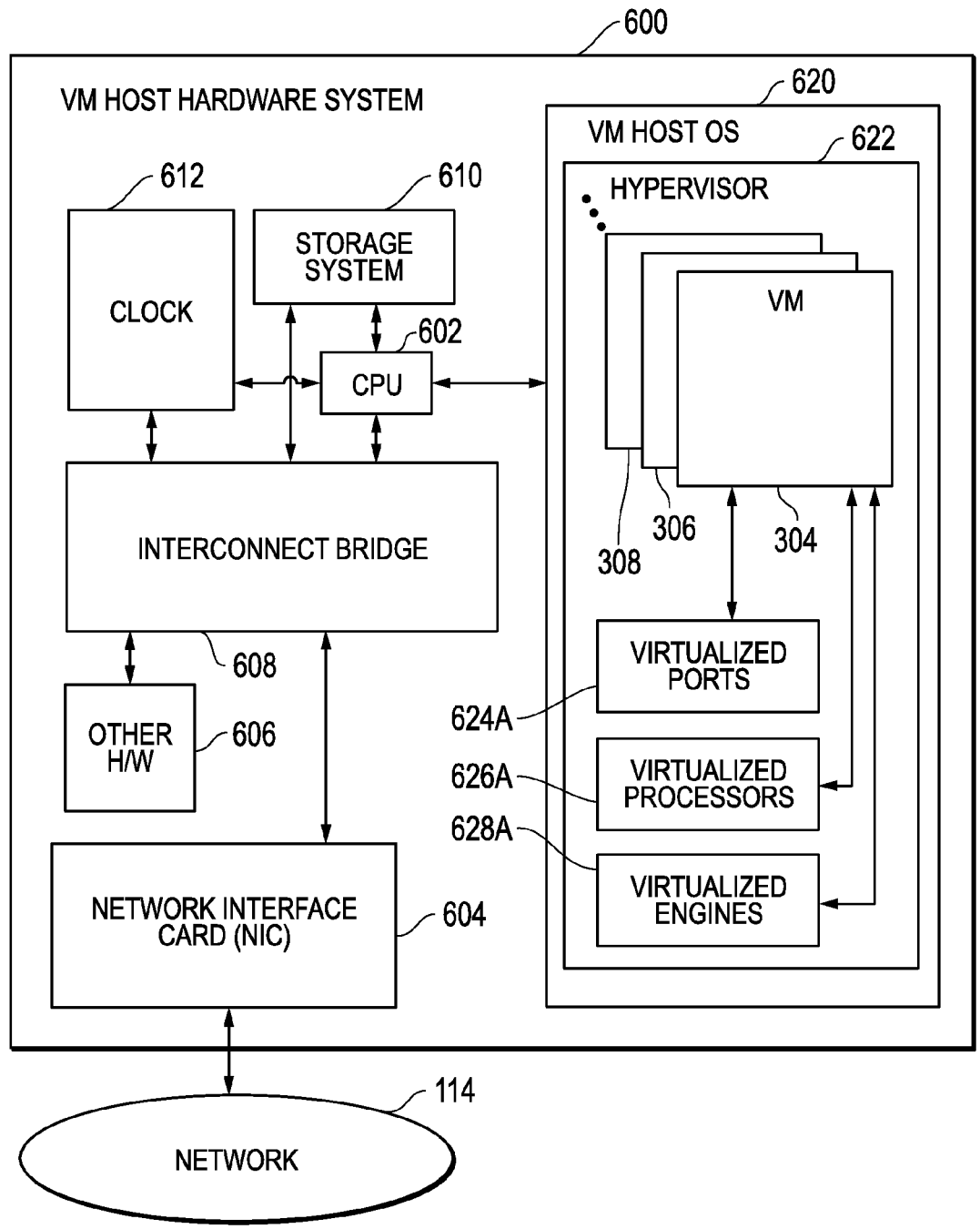
FIG. 6A is a block diagram of an example embodiment for a VM host hardware system that communicates with a packet communication network such as the Internet.
Figure 6B:
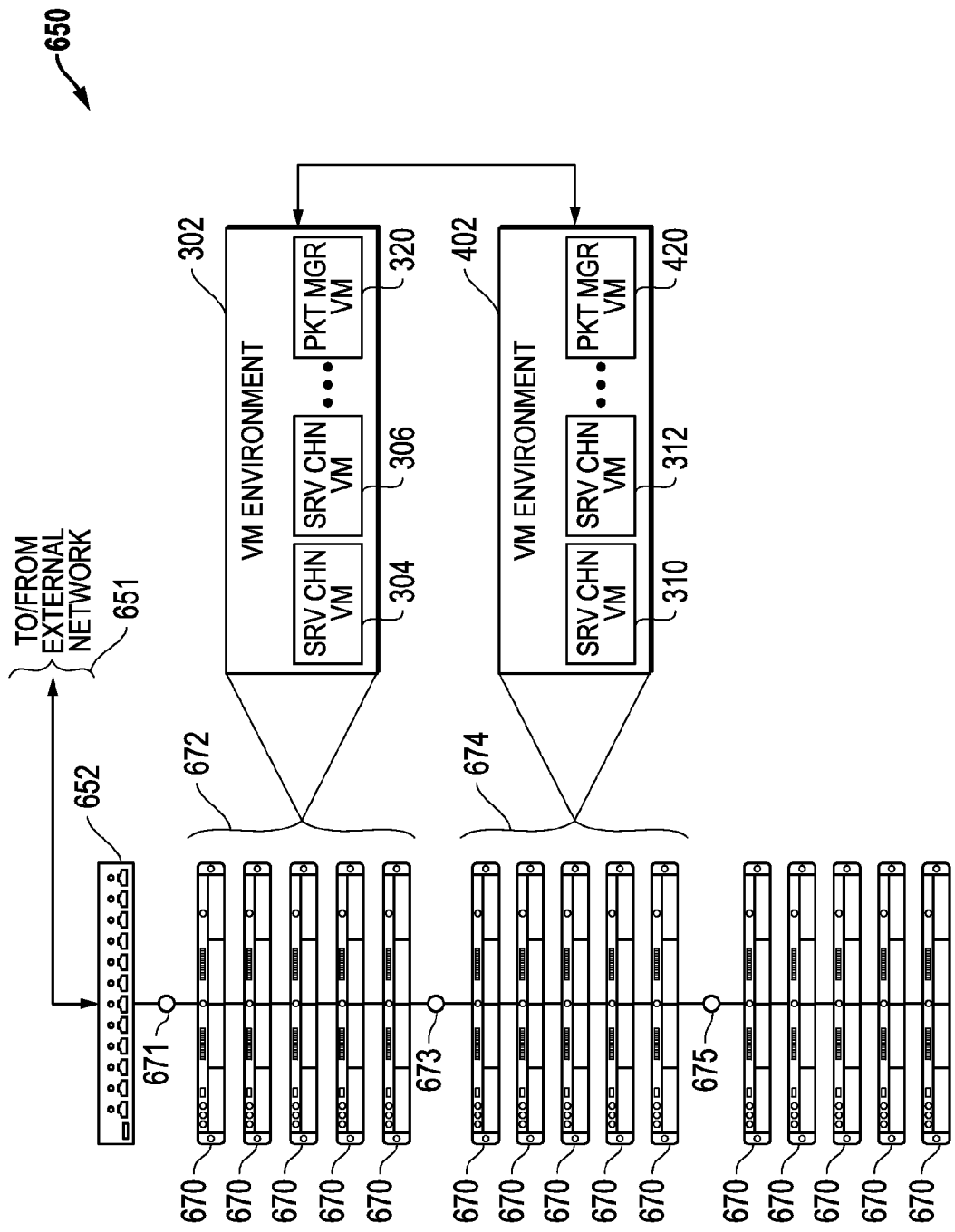
FIG. 6B is a block diagram of an example embodiment for a server system including multiple VM environments that provide VM servers.

FIGS. 6A-B provide further example embodiments of virtual environments. For example, one or more of the components within the service chain processing described herein can be virtualized such that they operate as one or more VMs within a virtual environment. Virtual resources can be made available, for example, through processors and/or processing cores associated with one or more server processing systems or platforms (e.g., server blades) used to provide software processing instances or VMs within a server processing system. A virtual machine (VM) is an emulation of a processing system that is created within software being executed on a VM host hardware system. By creating VMs within a VM host hardware system, the processing resources of that VM host hardware system become virtualized for use within the network communication system. The VMs can be configured to perform desired functions that emulate one or more processing systems, and as described herein, the VMs can provide service chain processing for network packets.

Looking now to FIG. 6A, a block diagram is provided of an example embodiment for a virtual machine (VM) host hardware system 600 that communicates with a packet communication network 114 such as the Internet. The host hardware system 600, for example, can provide the computer hardware 338/438 described above with respect to FIGS. 3A and 4. For the example embodiment depicted, the VM host hardware system 600 includes a central processing unit (CPU) 602 that runs the VM host operating system 620. An interconnect bridge 608 couples the CPU 602 to additional circuitry and devices within the computer hardware for the VM host hardware system 600. For example, a system clock 612, a network interface card (NIC) 604, a data storage system 610 (e.g., memory) and other hardware (H/W) 606 are coupled to the CPU 602 through the interconnect bridge 608. The system clock 612 and the storage system 610 can also have direct connections to the CPU 602. Other computer hardware elements and variations can also be provided.

The VM host hardware system 600 also includes a hypervisor 622 that executes on top of the VM host operating system (OS) 620. This hypervisor 622 provides a virtualization layer including one or more VMs that provide service chain processing, such as the service chain VMs 304/306/308, and so on that are described above. As shown with respect to VM 304, each of the VMs 304/306/308 and so on, can be configured to have one or more virtual computer hardware resources associated with it, such as virtualized input/output ports 624A, virtualized processors 626A, virtualized processing engines 628A, and/or other virtualized resources. The VM host hardware system 600 hosts each of these VMs and makes their service chain processing available to the network 114 through the VM host operating system 620 and the hypervisor 622. The hypervisor 622 provides a management and control virtualization interface layer for these VMs. It is further noted that the VM host operating system 620, the hypervisor 622, the VMs 304/306/308 and so on, and the virtualized hardware resources 624A/626A/628A can be implemented, for example, using computer-readable instructions stored in a non-transitory data storage medium that are accessed and executed by one or more processing devices, such as the CPU 602, to perform the functions described herein for the VM servers 302/402.

FIG. 6B is a block diagram of an example embodiment for a server system 650 including multiple VM environments that provide the VM server 302 and the VM server 402. For the example embodiment 650, a number of processing system platforms 670, such as blade servers that include one or more VM host hardware systems 600 of FIG. 6A, are connected to an external network communication system, such as the Internet, through connections 651 and to each other through a router or switch 652. For the example embodiment 650, the processing system platforms 670 are configured into three nominal groups as indicated by nodes 671, 673, and 675. The processing system platforms 670 within each group are managed together to provide virtual processing resources as part of the network communication system. For the example embodiment 650, one group 672 of processing system platforms 670 is used to host the first VM server 302 that includes VMs operating to provide service chain (SRV CHN) VMs 304 and 306 as well as other VMs including the packet manager (PKT MGR) VM 320, respectively. One other group 674 of processing system platforms 670 is used to host the VM server 402 that includes VMs operating to provide service chain (SRV CHN) VMs 310 and 312 as well as other VMs including the packet manager (PKT MGR) VM 420, respectively.

It is noted that other groupings of processing system platforms 670 can also be used, and all of the processing system platforms 670 can be managed individually or as a single unit. It is also noted that the VM platforms 304, 306 . . . 320 within the first VM server 302 can communicate with each other, with the other VM server 402, or with other processing systems or virtual environments within server system 650 or the external network. Similarly, the VM platforms 310, 312 . . . 420 within the second VM server 402 can communicate with each other, with the other VM server 302, or with other processing systems or virtual environments within server system 650 or the external network. Further, it is noted that the processing system platforms 670 can be connected to each other by a high-speed communication backbone. Other variations can also be implemented, as desired, while still taking advantage of the packet copy management techniques described herein.

It is further noted that the functional blocks, systems, devices, and/or circuitry described herein can be implemented using hardware, software, or a combination of hardware and software. In addition, one or more processing devices (e.g., central processing units (CPUs), controllers, microcontrollers, microprocessors, hardware accelerators, processors, programmable integrated circuitry, FPGAs (field programmable gate arrays), ASICs (application specific integrated circuits), and/or other processing devices) executing software and/or firmware instructions can be used to implement the disclosed embodiments. It is further understood that one or more of the operations, tasks, functions, or methodologies described herein can be implemented, for example, as software, firmware and/or other program instructions that are embodied in one or more non-transitory tangible computer-readable mediums (e.g., data storage devices, flash memory, random access memory, read only memory, programmable memory devices, reprogrammable storage devices, hard drives, floppy disks, DVDs, CD-ROMs, and/or any other tangible data storage medium) and that are executed by one or more processing devices (e.g., central processing units (CPUs), controllers, microcontrollers, microprocessors, hardware accelerators, processors, programmable integrated circuitry, FPGAs (field programmable gate arrays), ASICs (application specific integrated circuits), and/or other processing devices) to perform the operations, tasks, functions, or methodologies described herein.

Further modifications and alternative embodiments of this invention will be apparent to those skilled in the art in view of this description. It will be recognized, therefore, that the present invention is not limited by these example arrangements. Accordingly, this description is to be construed as illustrative only and is for the purpose of teaching those skilled in the art the manner of carrying out the invention. It is to be understood that the forms of the invention herein shown and described are to be taken as the presently preferred embodiments. Various changes may be made in the implementations and architectures. For example, equivalent elements may be substituted for those illustrated and described herein, and certain features of the invention may be utilized independently of the use of other features, all as would be apparent to one skilled in the art after having the benefit of this description of the invention.

What is claimed is:

1. A method to process packets in a predetermined order for service chain processing, comprising:
    operating a plurality of virtual machines (VMs) within a virtualization layer running on at least one processing device, the plurality of VMs comprising a packet manager VM and at least two service chain VMs, the service chain VMs being configured to process received packets in a predetermined order, and each of the service chain VMs including a virtual network interface controller (vNIC) having a receive queue and a transmit queue;
    receiving a network packet at the packet manager VM;
    storing packet data for the network packet within a shared memory for the packet manager VM;
    processing the packet data with the service chain VMs in the predetermined order to generate processed packet data without copying the packet data to memory associated with the service chain VMs, the processing comprising:
        using the receive queues within the vNICs for the service chain VMs to store receive address pointers for packet data within the shared memory to be processed by the service chain VMs;
        accessing and processing the packet data with the service chain VMs based upon the receive address pointers stored within the receive queues without copying the packet data to memory associated with the service chain VMs;
        using the transmit queues within the vNICs for the service chain VMs to store transmit address pointers for packet data within the shared memory that has been processed by the service chain VMs; and
        determining completion of processing by the service chain VMs based upon the transmit address pointers stored within the transmit queues; and
    transmitting the processed packet data from the packet manager VM to another destination.

2. The method of claim 1, wherein the transmitting comprises transmitting the processed packet data to a packet analysis tool.

3. The method of claim 2, wherein the packet analysis tool comprises an additional virtual machine (VM) operating within the virtualization layer and configured to analyze the processed packet data.

4. The method of claim 1, wherein the at least one processing device is located within a first server system, and wherein the destination is a virtual machine (VM) operating within a second virtualization layer running on at least one processing device located in a second server system.

5. The method of claim 4, further comprising operating a plurality of second VMs within the second virtualization layer, the plurality of second VMs comprising a second packet manager VM and a at least two additional service chain VMs.

6. The method of claim 1, further comprising tracking a state of the packet data with respect to processing by the service chain VMs using the packet manager VM.

7. The method of claim 6, further comprising adding a tag to the packet data within the packet manager VM to track the state of the packet data.

8. The method of claim 1, further comprising applying one or more packet filters to the packets received by the packet manager VM.

9. The method of claim 8, further comprising using the one or more packet filters within the packet manager VM to determine in part whether packet data is processed by one or more of the service chain VMs.

10. The method of claim 1, wherein the processing further comprises for each of the at least two service chain VMs:
    storing, with the packet manager VM, a receive address pointer within the receive queue within the vNIC for the service chain VM;
    based upon the receive address pointer, accessing and processing the packet data with the service chain VM without copying the packet data to memory for the service chain VM;
    storing, with the service chain VM, a transmit address pointer within the transmit queue within the vNIC for the service chain VM; and
    based upon the transmit address pointer, determining with the packet manager VM that the service chain VM has completed processing of the packet data.

11. The method of claim 1, further comprising controlling the predetermined order with the packet manager VM by controlling storage of the receive address pointers using the packet manager VM.

12. A system to process packets in a predetermined order for service chain processing, comprising:
    at least one processing device configured to provide a virtualization layer for a plurality of virtual machines (VMs);
    at least two service chain VMs configured to operate within the virtualization layer, the service chain VMs being configured to process received packets in a predetermined order to generate processed packet data, and each of the service chain VMs including a virtual network interface controller (vNIC) having a receive queue and a transmit queue;
    a packet manager VM configured to operate within the virtualization layer, the packet manager VM being configured to receive packets being processed by the service chain VMs; and
    a shared memory included within the packet manager VM configured to store packet data for packets being processed by the service chain VMs;
    wherein the receive queues within the vNICs for the service chain VMs are configured to store receive address pointers for packet data within the shared memory to be processed by the service chain VMs;
    wherein the service chain VMs are further configured to use the receive address pointers stored within the receive queues to access and to process the packet data within the shared memory without copying the packet data to memory associated with the service chain VMs;
    wherein the transmit queues within the vNICs for the service chain VMs are configured to store transmit address pointers for packet data within the shared memory that has been processed by the service chain VMs; and
    wherein the packet manager VM is further configured to determine completion of processing by the service chain VMs based upon the transmit address pointers stored within the transmit queues and to transmit the processed packet data to another destination.

13. The system of claim 12, wherein the destination comprises a packet analysis tool.

14. The system of claim 13, wherein the packet analysis tool comprises an additional virtual machine (VM) configured to operate within the virtualization layer and to analyze the processed packet data.

15. The system of claim 12, wherein the at least one processing device is located within a first server system, and wherein the destination comprises a virtual machine (VM) configured to operate within a second virtualization layer running on at least one processing device located in a second server system.

16. The system of claim 15, further comprising a plurality of second VMs configured to operate within the second virtualization layer, the plurality of second VMs comprising a second packet manager VM and a at least two additional service chain VMs.

17. The system of claim 12, wherein the packet manager VM is further configured to track a state of the packet data with respect to processing by the service chain VMs.

18. The system of claim 17, wherein the packet manager VM is further configured to add a tag to the packet data to track the state of the packet data.

19. The system of claim 12, wherein the packet manager VM is further configured to apply one or more packet filters to the packets received by the packet manager VM.

20. The system of claim 19, wherein the one or more packet filters are configured to determine in part whether packet data is processed by one or more of the service chain VMs.

21. The system of claim 12, wherein for each of the at least two service chain VMs, that service change VM and the packet manager VM are further configured to:
- store, with the packet manager VM, a receive address pointer within the receive queue within the vNIC for the service chain VM;
- based upon the receive address pointer, access and process the packet data with the service chain VM without copying the packet data to memory for the service chain VM;
- storing, with the service chain VM, a transmit address pointer within the transmit queue within the vNIC for the service chain VM; and
- based upon the transmit address pointer, determine with the packet manager VM that the service chain VM has completed processing of the packet data.

22. The system of claim 12, wherein the packet manager VM is further configured to control the predetermined order by controlling storage of the receive address pointers.

* * * * *